Oct. 17, 1933.  T. R. HARRISON  1,931,223
POTENTIOMETER INSTRUMENT
Filed Feb. 4, 1932  5 Sheets-Sheet 1

INVENTOR.
Thomas R. Harrison,
BY John E. Hubbell
ATTORNEY

Oct. 17, 1933.   T. R. HARRISON   1,931,223
POTENTIOMETER INSTRUMENT
Filed Feb. 4, 1932   5 Sheets-Sheet 5

INVENTOR.
Thomas R. Harrison
BY John E. Hubbell
ATTORNEY

Patented Oct. 17, 1933

1,931,223

UNITED STATES PATENT OFFICE 1,931,223

POTENTIOMETER INSTRUMENT

Thomas R. Harrison, Wyncote, Pa., assignor to The Brown Instrument Company, Philadelphia, Pa., a corporation of Pennsylvania Application February 4, 1932. Serial No. 590,842

14 Claims. (Cl. 175—183)

The general object of the present invention is to provide a potentiometer instrument having improved means for the automatic recalibration or re-standardization of the instrument at suitable intervals, to compensate for variations in voltage of the source of current employed to energize the potentiometer.

More specifically a main object of the present invention is to provide a potentiometer instrument including automatic rebalancing mechanism with simple and effective additional mechanism through which the automatic rebalancing mechanism of the instrument is utilized in its automatic recalibration, and whereby the recalibration is effected as a result of a sufficient number of rebalancing operations to insure a practically perfect recalibration result.

A still more specific object of the present invention is to provide simple and effective recalibrating provisions which can be added at a relatively small expense and without increase in bulk or impairment in measuring efficiency to a potentiometer instrument now in public use in this country and which includes provisions invented by me whereby each of an indefinite series of measuring operations require a variable plurality of rebalancing operations, and whereby a record of each measurement is made only after such plurality of rebalancing operations have occurred.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Figures 6, 7, 8:
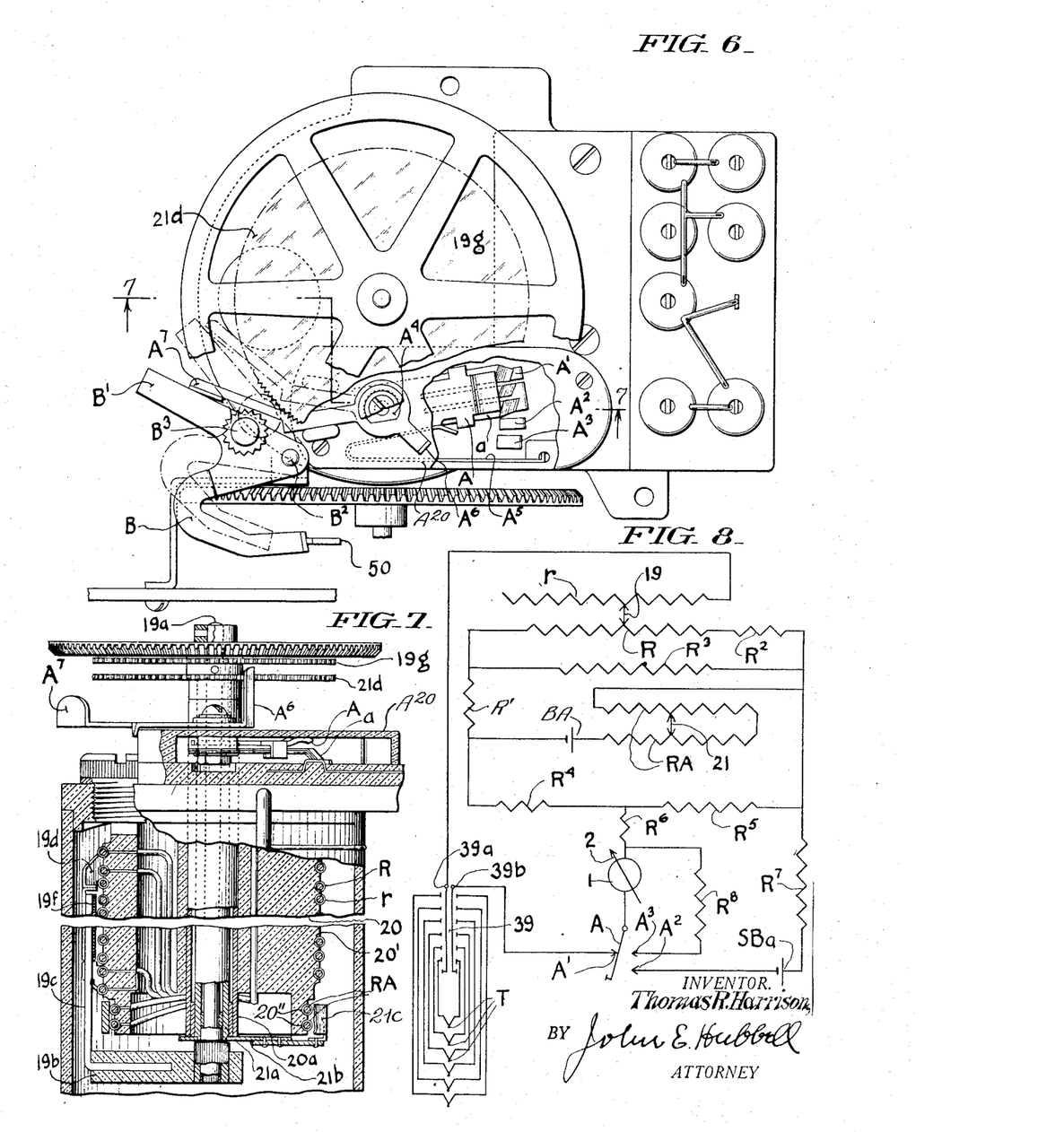
Fig. 6 is a plan view of a portion of the instrument.
Fig. 7 is a partial section on the line 7—7 of Fig. 6.
Fig. 8 is a circuit arrangement diagram.

In the typical potentiometer circuit arrangement illustrated in Fig. 8, $Ba$ designates a substantially constant source of electromotive force, ordinarily a dry cell, connected in series with an adjustable resistor RA which may be adjusted to vary the current flow in the circuit containing a ballast resistor $R'$, a slide wire resistor R, and another ballast resistor $R^2$, and a calibrating resistor $R^3$. The latter is in shunt to the resistors R and $R^2$ and its value and manner of connection may be varied to thereby vary the measuring range of the potentiometer circuit. Resistors $R^4$ and $R^5$ are connected in series with one another and in shunt about the source of current Ba and the resistor RA. In the normal use of the above described circuit features in measuring the variable electromotive force of an element, such as a thermocouple, said element is connected in series with a galvanometer 1 between the junction point of the resistors $R^4$ and $R^5$ and the slide wire resistance R at a point along the length of the latter which is varied as may be necessary to bring the galvanometer pointer 2 into its neutral position.

In Fig. 8, a plurality of thermocouple elements T may thus be connected into the potentiometer measuring circuit one after another by the operation of a selector switch 39 to successively connect the terminals of the different thermocouples to the switch terminals $39a$ and $39b$ when the switch A is in the position in which it engages a switch contact $A'$ connected to the terminal $39b$ of the switch 39. The switch member A is connected to one terminal of the galvanometer 1, and the latter has its second conductor connected through a resistor $R^6$ to the junction of the resistors $R^1$ and $R^5$. The terminal $39a$ of switch 39 is connected to one terminal of a resistor $r$. The latter is connected to the slide wire resistor R by an adjustable bridging contact 19.

In each measuring operation, the contact 19 is adjusted along the slide wire resistor R until the galvanometer pointer 2 occupies its neutral position. It occupies such position when the voltage of the thermocouple T then in series with the galvanometer 1 is equal and opposite to the potential drop between the junction of the resistors $R^4$ and $R^5$ and a point along the length of the resistor R engaged by the bridging contact 19. When the voltage of the thermocouple exceeds, or is less than, the said voltage drop, the galvanometer pointer 2 deflects in one direction or the other from its neutral position, and the potentiometer is said to be unbalanced. The operation of adjusting the bridging device 19 along the slide wire resistor R until the galvanometer pointer 2 gives zero deflection, is commonly referred to as a potentiometer rebalancing operation. When a potentiometer is automatically rebalanced following the connection of a thermocouple element to the potentiometer, the initial rebalancing operation cannot be relied upon to give perfect potentiometer balance, and in the instrument disclosed herein, provisions are made for effecting a suitable plurality of rebalancing operations in the course of each measuring operation.

With the circuit arrangement shown in Fig. 8, the amount of the resistor $r$ in circuit is varied by the movement of the bridging device 19 along the slide wire resistor R. Such variation of the resistor $r$ in circuit is not essential, but is desirable from the point of galvanometer accuracy, because it tends to keep the total resistance in the galvanometer circuit approximately constant. It thereby eliminates or minimizes variations in galvanometer accuracy and sensitivity for reasons which need not be explained herein, as the variation in the resistance portion of the resistor $r$ in circuit is not a feature of the present invention, and is disclosed and claimed in my prior application Serial No. 322,269, filed November 27, 1928.

While the electromotive force of the source $Ba$ was described above as approximately constant, when said source is a dry cell its voltage ordinarily diminishes progressively throughout the working life of the cell. While a variation in the voltage of the source $Ba$ does not prevent the rebalancing of the potentiometer, in practice accurate measurements are obtainable only by so compensating for such voltage variations as to maintain an approximately constant current flow through the potentiometer circuit. Such compensation may be effected by adjusting a bridging or short-circuiting contact device 21 as required to short-circuit more or less of the resistor RA. Such adjustment of the bridging contact 21 constitutes the recalibration of the potentiometer with which the present invention is concerned.

The recalibration action automatically carried out with the instrument herein disclosed involves a periodic adjustment of the switch contact A to disconnect the latter from the contact A′, and to connect it to a contact $A^2$, whereby the galvanometer is connected across the terminals of the ballast resistance $R^5$ through a shunt circuit including a ballast resistor $R^7$ and a source $SBa$ of constant or standard electromotive force. Said source in ordinary practice is a standard cell. After the galvanometer is thus connected to measure the potential drop through the ballast resistor $R^5$, the bridging contact 21 is adjusted until just such portion of the resistor RA is in circuit as is required to make the potential drop therein equal to the opposing electromotive force of the standard cell $SBa$. When this condition of balance is attained, the pointer 2 of the galvanometer 1 occupies its neutral position. To damp the movement of the galvanometer pointer 2 when the switch A first connects the galvanometer 1 in series with the cell $SBa$, a resistance $R^8$ is provided. The latter is connected in shunt to the galvanometer when the switch A engages the contact $A^2$, as the switch A then also engages a contact $A^3$ connected to one terminal of the resistor $R^8$, the other terminal of the resistor $R^8$ being permanently connected to that terminal of the meter 1 which is connected to the resistance $R^6$.

The instrument disclosed herein is a recording potentiometer instrument including provisions, now to be described, for automatically adjusting the bridging contact 19 at regular intervals, as required to rebalance the potentiometer circuit, and means by which use is made at less frequent intervals of said rebalancing provisions to adjust the bridging contact 21 and thereby recalibrate the potentiometer to compensate for variations in the voltage of the potentiometer energizing cell $Ba$. The galvanometer 1 shown diagrammatically in Fig. 8 forms a part of said instrument. The instrument also comprises mechanical relay provisions operated by a constantly rotating driving shaft 12 and controlled by the deflection of the galvanometer pointer 2 away from its normal zero position, which periodically rebalance the potentiometer circuit and move a pen or other recorder carriage 23 along a travelling record strip 26 to record the varying value of the quantity measured on said strip.

In respect to its measuring and recording functions, the instrument shown in Figs. 1–7 is of the form disclosed in an application for patent, Serial No. 546,290, filed June 23, 1931, jointly by Ernest H. Grauel, Ernest Kessler and myself, and comprises numerous features of construction and arrangement invented by me and forming the subject matter of pending applications for patents filed by me.

Figures 1, 4:
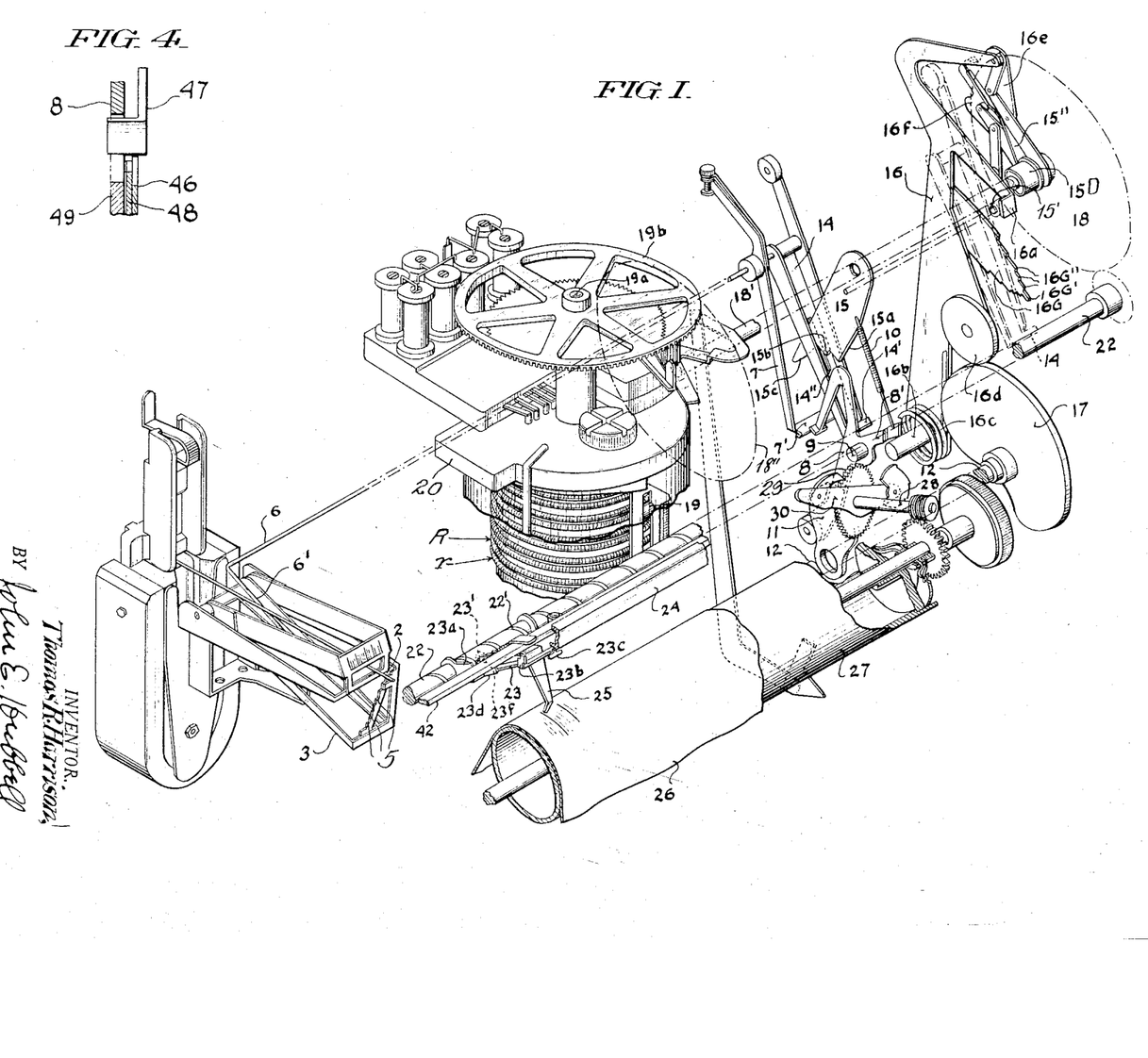
Fig. 1 is a perspective view of operative parts of an automatically rebalancing recording potentiometer instrument.
Fig. 4 is a partial section on the line 4—4 of Fig. 3.

The mechanism of the instrument of Fig. 1 through which the deflection of the galvanometer pointer 2 controls the adjustments of the recorder carriage 23 and the rebalancing of the potentiometer circuit on a variation in the quantity or value measured by the galvanometer comprises a pointer engaging and position gauging element 3. The latter is pivotally supported and in connection with the hereinafter mentioned shaft 6 has a loading tendency, which may well be due partly to spring and partly to gravital action, to turn upward into the position in which one or another of the shoulders 5 of the member 3 engage the pointer 2. The element 3 is engaged by, and turns, with the arm 6′ of a rock shaft 6. A spring 10 tends to hold a rocker 8 which is journaled on a pivot 9, in the position in which the rocker engages an arm 7 secured to the shaft 6 and thereby holds the latter in a position in which the shoulders 5 are all below the pointer 2.

The driving shaft 12 which may be rotated by a constantly running motor (not shown) in the usual manner carries a cam 11 which turns the rocker 8 about its pivot against the action of the spring 10, once during each revolution of the shaft 12. This allows the arm 7 to turn counterclockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less according to the deflective position of the pointer 2 at the time. When the arm 7 thus turns counter-clockwise, a lateral projection 7′ of that arm engages and turns a secondary pointer element 14 into a position corresponding to the then deflection of the pointer 2. The secondary pointer 14 is loosely journaled on the shaft 6, and has a gravital loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15A, 15B and 15C of a locking member 15, engages the bottom wall of a slot 14' in the member 14 and thereby frictionally holds the latter in the position occupied by it when such engagement occurs. When the pointers 2 and 14 occupy their neutral positions, the shoulder 15B of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15C. When the galvanometer pointer deflects in the opposite direction from its neutral position, as it does when the actual value of the quantity measured is higher than that indicated by the existing potentiometer adjustment, the pointer 14 is engaged and locked by the shoulder 15A of the member 15. The locking part 15 is given a tendency to move into locking engagement with the secondary pointer 14 by the spring 10, but is periodically held out of such engagement by the action on its projection 15' of a projection 16A carried by a ratchet lever 16 pivoted at 16B.

A spring 16C gives the lever 16 a tendency to turn forward in the clockwise direction as seen in Fig. 1, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls has a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2 is in its neutral position.

The position assumed by the part 15 when in locking engagement with the secondary pointer 14, controls the action of the pawls 16E and 16F by virtue of the fact that a collar or hub portion 15D of the part 15 carries a spring pawl engaging arm 15''. The movement of the locking part 15 into the position in which its shoulder 15A engages the secondary pointer 14 causes the arm 15'' to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15C engages the secondary pointer 14, the arm 15'' shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14' of the secondary pointer 14 and thereby arrest the forward movement of the ratchet lever 16. In the neutral position of the galvanometer pointer 2 and secondary pointer 14, the projection 14' of the latter engages the central shoulder 16G' of the arm 16G and the lever 16 is then held against any operative movement in the clockwise direction. When the secondary pointer position is more or less to one side or the other of its neutral position, the portion 14' engages an upper or lower shoulder 16G'' more or less distant from the central shoulder 16G' and the lever 16 is then permitted more or less forward movement.

In the rebalancing operation, the rotation of the wheel 18 in one direction or the other, effects corresponding rebalancing adjustments of the bridging contact 19 and adjustments of the recorder carriage 23 proportional to the adjustments of the contact 19. The rebalancing adjustments of the contact 19 are directly effected through a shaft 19a carrying a bevel gear 19b which is in mesh with, and rotated by, a bevel gear 18'' secured to the shaft 18' on which the wheel 18 is secured.

The shaft 19a forms part of a rebalancing and recalibrating slide wire unit which comprises a body member 20 formed of insulating material and supported from the framework of the instrument, and in which the shaft 19a is mounted. The member 20, which may be formed of molded bakelite, comprises a cylindrical body portion about which the slide wire resistor R and the resistor r are helically wound in side by side convolutions, the member 20 being formed with helical grooves 20' to receive said resistors R and r. Each of the latter is shown as in the form of a wire wound about a core, said core and the wire coiled about it being arranged in large diameter helical convolutions received in the corresponding groove 20'. The resistor RA, which may also be formed of wire wound around a core, comprises two connected portions one secured in one, and the other in the second of two side-by-side peripheral grooves 20'' formed at the lower end of the member 20. Axially disposed within the member is a tube 20a. The latter may be molded in the member 20, and forms a bearing sleeve for a hollow shaft 21a. The hollow shaft 21a forms a bearing sleeve for the shaft 19a.

An arm 19b secured to the lower end of the shaft 19a supports a post 19c parallel to the shaft 19a and located at the outer sides of and in proximity to the helical convolutions of the slide wire resistor R and resistor r. Hinged to the post 19c is a bridging contact supporting and guiding member 19d formed with a slot 19e extending parallel to the shaft 19a. The bridging contact 19 is a cylindrical body of metal with axle-like end portions 19', which lie between the body 20 and frame 19d and are engaged by the portions of the latter at the opposite sides of the slot 19e. The outer portion of the body of the bridging contact 19 extends through the slot 19e and the ends of said body portion bear against the opposite side edges of said slot. A spring 19f coiled about the pintle of the hinge connection of the post 19c and frame 19d constantly urges the latter radially inward and thereby holds the contact 19 against adjacent portions of the convolutions of the resistors R and r. The parts are so proportioned that said resistors serve in effect as the opposite sides of a thread groove which surrounds the body 20 and is engaged by a mutilated nut of which the bridging contact 19 forms a short thread-rib portion. When the shaft 19a is rotated, the bridging contact 19 is moved along the thread groove or helical track formed by the convolutions of the resistors R and r, thereby adjusting the point along the length of the slide wire resistor R at which the latter connected to the resistor r, and also varying the amount of resistance r in circuit.

The recalibration bridging contact 21 is supported by, and is adjusted from time to time along the two convolutions of the resistor RA by the rotation of a tubular shaft 21a. To this end the shaft 21a carries at its lower end an arm 21b located beneath the plane of the arm 19c and supporting on its free end a plate member 21c. The contact 21 is similar in form to the contact 19 and is supported in a slot 21d in the plate 21c generally as the contact 19 is supported in the slot 19e of the plate member 19d. When the shaft 21a is rotated the contact 21 is moved along the track formed by the two side by side convolutions of the resistor RA which are connected by the contact so that the amount of resistance RA in circuit is thereby varied. During the measurement and normal re-balancing operations of the instrument, the contact 21 and tubular shaft 21a are stationary, but at intervals, as is hereinafter described in detail, the shaft 21a is gear-connected to the shaft 19a so that the rotation of the latter rotates the shaft 21a and adjust the contact 21 along the track formed by the two convolutions of the resistor RA.

The rotation of the wheel 18 adjusts the position of the recorder carriage 23 by virtue of the fact that the teeth of the wheel 18 are in mesh with the teeth of a gear secured to the carriage adjusting shaft 22. The shaft 22 is formed with a thread groove 22' of coarse pitch which receives a cam or mutilated screw thread rib 23' secured to the carriage 23 so that the latter is moved longitudinally of the shaft 22 as the latter is rotated.

The record sheet 26 passes over and is given feeding or advancing movements by a record feed roll 27. The latter is intermittently rotated by means of a worm and screw connection between the shaft of the roll 26 and a transverse shaft 28 carrying a ratchet wheel 29. The ratchet wheel 29 is engaged and moved by a ratchet lever 30 on each oscillation of the latter. The lever 30 is engaged and oscillated by the arm 8' of the rocker 8 on each oscillation of the latter.

The recorder carriage 23 comprises a frame portion formed of sheet metal cut and bent to form apertured ears 23a at one side through which the shaft 22 extends and a guide projection 23b in sliding engagement with a stationary guide rail 24 which may carry scale markings with which a pointer or index portion 23c of the carriage registers to thereby show the position of the carriage along the scale and the value of the quantity measured which varies with the position of the carriage along the scale. The carriage is also provided with projections 23d in which is journalled a pivot shaft 23f supporting a pivoted marker element 25. The latter is in effect a hammer and makes a record on the record sheet 26 by striking the latter through a transfer ribbon 31. The transfer ribbon is carried by a ribbon supporting frame 32 pivotally connected at 33 to the instrument framework and provided with the usual ribbon supporting and guiding provisions which need not be illustrated or described herein.

The ribbon supporting frame 32 is normally held by a ratchet lever 38 in a retracted position in which neither the ribbon nor its supporting frame interfere with visual inspection of the record. The frame 32 is so held in its retracted position by the engagement of its projection 32' with the lever 38. The latter is periodically turned clockwise from the position shown in Fig. 2 into the position shown in Fig. 3 and the frame 32 then turns counter-clockwise under the action of gravity until a pin 32'' carried by the frame 32 engages a tooth or valley portion of a star wheel 34 carried by a shaft 35 which actuates the selector switch 39. The latter need not be illustrated and described herein as it may be of any known or suitable form, and, in particular, may be of the form disclosed and claimed in my prior Patent No. 1,770,918, granted July 22, 1930.

The greater or lesser advancement of the transfer ribbon resulting from the engagement of the pin 32'' with a low or high peripheral portion of the wheel 34, positions one or another longitudinal section of the transfer ribbon 31 between the hammer end of the marker element 25 and the recorder sheet. By making use of the invention of the Grisdale Patent No. 1,564,558, granted December 8, 1925, it is possible with a few such ribbon sections of different colors to make readily distinguishable records for a large number of thermocouples T. A ratchet wheel 36 secured to the shaft 35 is intermittently advanced, a tooth at a time, by an operating pawl 37, carried by the ratchet lever 38, the latter being pivoted on the shaft 35.

Reverse movement of the shaft 35 under the frictional drag of the pawl 37 on the return stroke of the lever 38, is prevented by a locking pawl 36A.

The rotation of the ratchet wheel 36 oscillates the recording hammer 25 through a lever 40 pivoted at 40' and having one end riding on the toothed periphery of the wheel 36 and having its other end connected to one arm of a bell crank lever 41 pivoted at 41'. The second arm of lever 41 is connected to a bar 42. When the lever 40 drops off a tooth of wheel 36 and then rides up on a following tooth, the bar 42 is moved down and up, and gives corresponding movements to the hammer 25 which is in sliding engagement with said bar. A spring 43 connecting the pawl 37 and lever 40 gives the latter a snap action as it drops off each tooth of wheel 36 and thus contributes to sharp record impressions. The spring 43 also holds the pawl 37 against the periphery of the wheel 36, and normally holds the ratchet lever 38 in its uppermost position in which it bears against a fixed stop 44.

Figure 2:
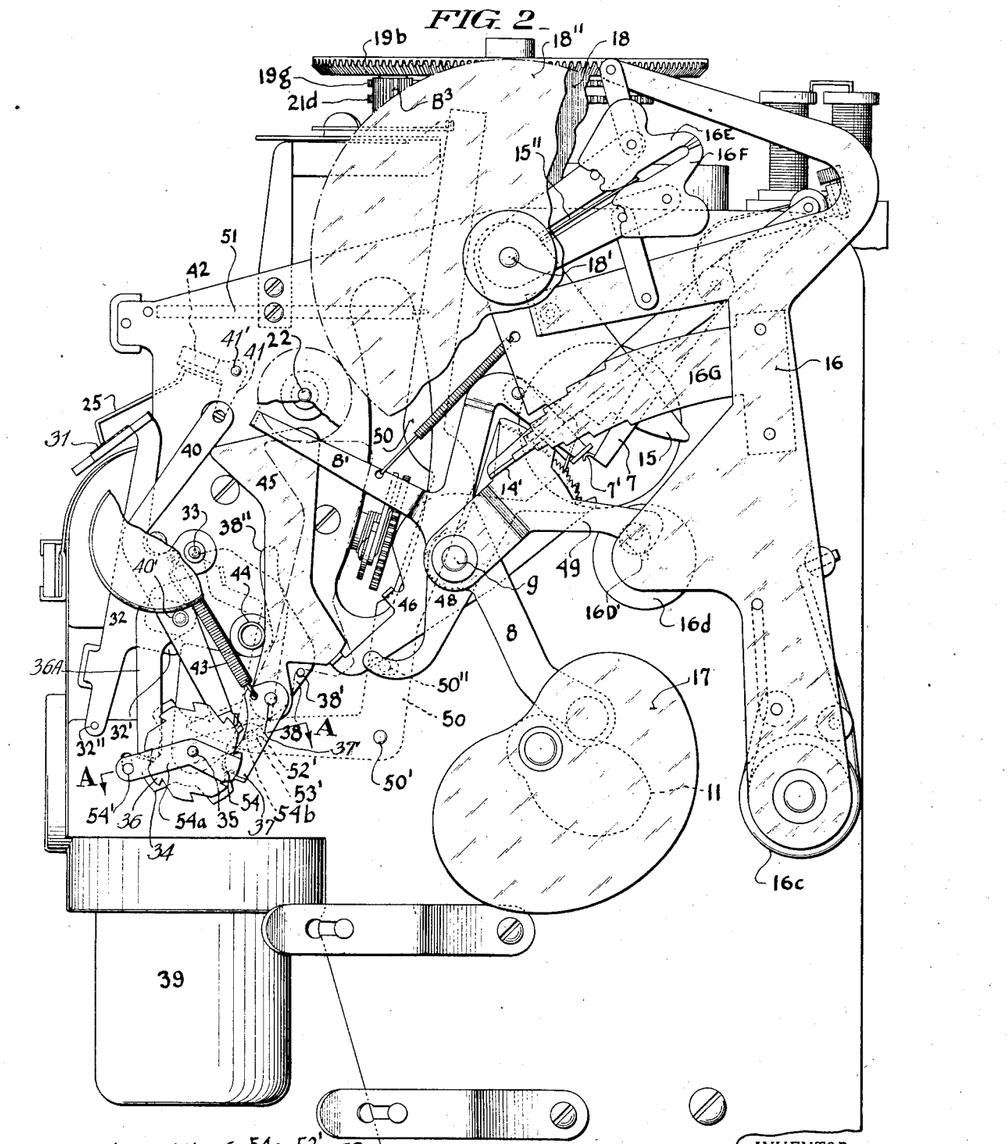
Fig. 2 is an end elevation, with parts broken away, of the instrument illustrated in part in Fig. 1.
Figure 2A:
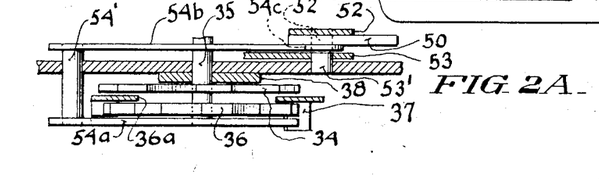
Fig. 2A is a partial section on the broken line A—A of Fig. 2.
Figure 3:
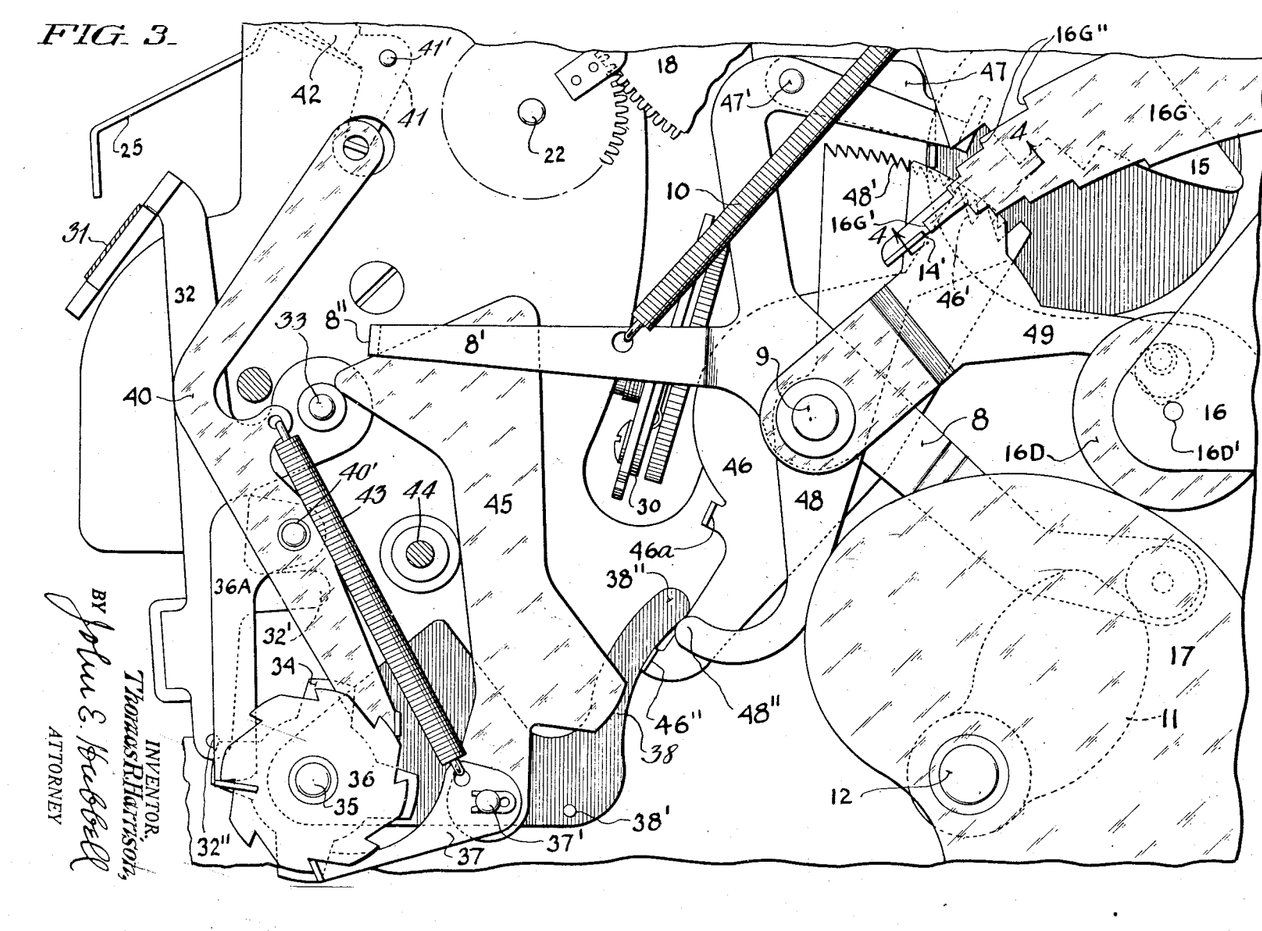
Fig. 3 is an end elevation taken similarly to Fig. 2, but on a larger scale and with additional parts removed, and illustrating some parts in relative positions different from those shown in Fig. 2.

The ratchet lever 38 is turned clockwise about the shaft 35 from the position shown in Fig. 2 into that shown in Fig. 3, to thereby advance the wheel 36 one tooth on each oscillation of the rocker 8 in the counter-clockwise direction occurring during a period in which a thrust member 45 is held in the full line position shown in Fig. 2 in which said member is adjacent a stop 44. In that position, the member 45 which is pivoted on the pivot pin 37' connecting the pawl 37 to the ratchet lever 38, acts as a thrust block interposed between the pivot pin 37' and the projection 8'' at the end of the arm 8' of the rocker 8. The turning movement about the shaft 35 then given the lever 38 as the projection 8'' descends, carries the arm 38'' of the lever 38 into the position shown in full lines in Fig. 3, and in turning into the last mentioned position the arm 38" engages the lower end 46" of a lever 46 and the lower end 48" of another lever 48 and turns those levers into the positions shown in Fig. 3. As the rocker arm 8' makes its return upstroke, the spring 43 returns the lever 38 to its full line position, but does not effect a corresponding return movement of the lever 46. In consequence, the member 45 then is gravity held in its dotted line position shown in Fig. 2, in which it rests against a stop 38' carried by the lever 38, and in which its upper end is out of the path of movement of the projection 8". No subsequent counter-clockwise rotation of the rocker 8 gives movement to the lever 38 and ratchet wheel 36 until the lever 46 is again returned to its full line position.

The lever 46 is returned to its full line position as a result of a plurality of rebalancing operations, said plurality varying from a minimum of two up to a predetermined maximum which may well be twenty or thereabouts and which is fixed by the pitch of the hereinafter mentioned teeth 48' carried by the lever 48. The levers 46 and 48 are mounted to turn about the supporting stud 9 for the rocker 8, and are so mounted as to have a frictional tendency to remain in the positions assumed by them until subjected to external forces displacing them from such positions. The lever 46 is returned to its full line position by the direct, indirect, or partly direct and partly indirect action of a pawl 47 pivoted at 47' to an arm of the rocker 8. The direct action on the lever 46 of the pawl 47 occurs when the pawl engages with one or first with one and then with another of two teeth 46' carried by the upper end of the lever 46. The indirect action of the pawl 47 on the lever 46 results from the engagement by the pawl of the teeth 48' carried at the upper end of the lever 48 and the movement of the latter against a projection 46a of the lever 46. Movement of the lever 48 under the action of the pawl 47 continuing after the lever has engaged the projection 46a moves the lever 46 toward and may eventually move it into its full line position.

Whether or not on any particular clockwise rotation of the rocker 8 the pawl 47 will engage a tooth 46' of the lever 46 depends upon the position at the time of a tooth shielding member 49. The position of the member 49 at that time depends indirectly upon the position of the secondary pointer 14 and depends directly upon the position of the drive lever 16 when its advancing movement is arrested by the engagement of one of the shoulders of part 16G with the secondary pointer projection 14'. The position of the member 49 is so controlled as a result of the fact that it tends to turn clockwise under the action of gravity about the stud 9 to which it is pivotally connected and that its gravital movement is controlled by the engagement of a cam edge portion of the member 49 with an extension of the pivot pin 16D' on which the follower roll 16D is journalled.

In the neutral position of the secondary pointer, illustrated in Fig. 3 and a perfect or approximately perfect condition of potentiometer balance in which the shoulder 16G' engages the projection 14', the part 49 is held in its uppermost position by the pin 16D'. The pawl 47 is then free to engage a tooth 48' and a tooth 46' at the beginning of its down stroke and to maintain such engagement until said stroke is completed. If in such case at the beginning of said stroke the lever 46 is in its position shown in full lines in Fig. 3, the pawl 47 will then engage the lower tooth 46' and move the lever 46 into an intermediate position in which the pawl 47, on its following down stroke, can engage the second tooth 46', if the member 49 is then also in its uppermost position shown in Fig. 3. In such case the return of the member 46 to its full line position is effected by two potentiometer rebalancing operations and results from the direct action of the pawl 47 on the teeth 46'. While in such case the pawl 47 on each stroke would engage a tooth 48' of the lever 48 and give the latter the same turning movement as is given to the lever 46, the movement given to the lever 48 would not contribute to the return of the lever 46 to its full line position.

When at the beginning of the down stroke of the pawl 47, the projection 14' engages one of the teeth 16G" so that the pivot pin 16D then occupies a position downward and to the left of that shown in Fig. 3, the member 49 will occupy a lower position in which it prevents the pawl 47 from engaging either tooth 46' or from engaging any tooth 48' until the down stroke of the pawl 47 is so nearly completed that it will advance the tooth 48' engaged, only for a distance corresponding to the distance between that tooth and an adjacent tooth 48'. If the series of rebalancing operations preceding each partial rotation of the ratchet wheel 36 includes none in which perfect balance is attained, the lever 48 will be advanced a tooth at a time until the predetermined number of such advances has caused the lever 48 to engage the projection 46a and move the lever 46 into its full line position as shown in Fig. 2. Whenever in that series of operations perfect balance is obtained, the next down stroke of the pawl 47 will directly move the lever 46 as either into its said intermediate position or into its full line position and will correspondingly advance the lever 48, and it will be apparent, therefore, that the lever 46 may be moved from its initial position into its full line position by the first two balancing operations if each of those operations result in perfect balance, or by any greater number of rebalancing operations including either one or two in which perfect balance is obtained, up to a maximum number of rebalancing operations required for the return of the lever 46 by the advancement of the lever 48 one step at a time, in case perfect balance is not attained prior to the last down stroke of the pawl 47 required to return the lever 46 through the action of the lever 48.

Figure 5:
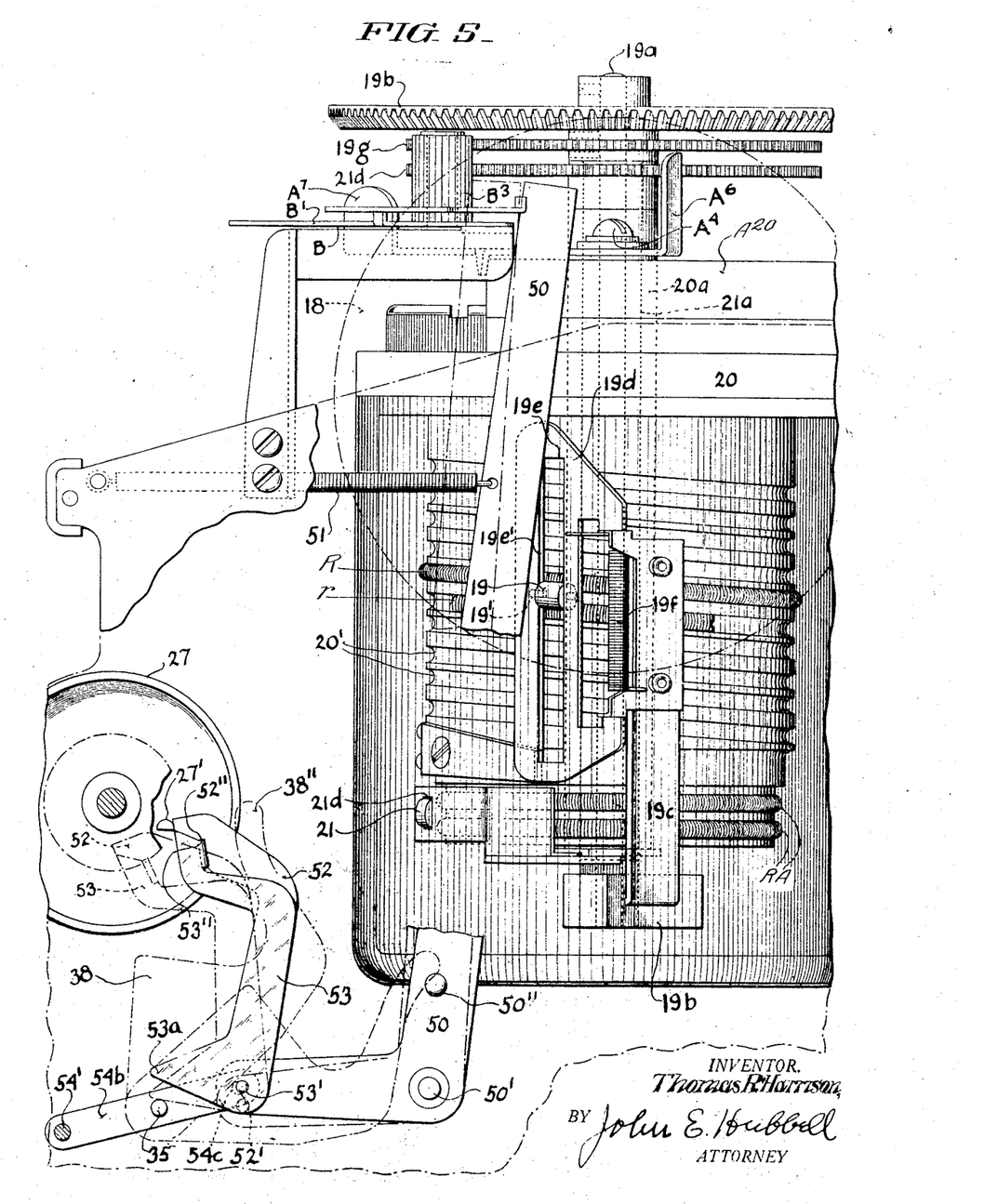
Fig. 5 is an elevation of parts of the instrument.

The recalibration of the instrument is effected once during each revolution of the record feed roll 27 and each recalibration is initiated by the first downstroke of the pawl lever 38 occurring after a tripping projection 27' caried by the roll 27 is moved into the position shown in Fig. 5. The recalibration action then initiated includes the adjustment of the switch A to disconnect the galvanometer from the contact A' and to connect it to the contact A² and A³, and includes a plurality of recalibration operations which differ from the previously described potentiometer rebalancing operation, only in that they produce operative adjustments of the bridging contact 21 and not of the bridging contact 19. Said recalibration operations also effect position adjustments of the bridging contact 19, but the adjustments of the latter resulting from the recalibration operations are idle adjustments, since the position of the switch A is then such that the resistance $r$ is disconnected from the galanometer. The recalibration action is completed only after a number of recalibration operations effective to move the member 46 from the position shown in Fig. 3 into that shown in full lines in Fig. 2. The down stroke of the pawl lever 38 following such movement of the part 46 into the full line position shown in Fig. 2, results in the return of the switch A to its normal position of engagement with the contact A' and puts the instrument back into condition to perform its normal measuring functions which are interrupted during recalibration.

The switch A comprises a spring switch blade or brush $a$ secured to a shaft $A^4$. The latter is journaled in a part $A^{20}$ detachably secured to the top of the body 20, and is normally held by a spring $A^5$ in the position shown in Fig. 6 in which the blade or brush $a$ engages the contact A'. In that position of the switch A the tubular shaft $21a$, by which the bridging contact 21 is supported, is locked against rotation by an arm $A^6$, which is secured to the shaft $A^4$ and then enters the space between adjacent teeth of a gear wheel $21d$ secured to the upper end of the shaft $21a$.

A switch operating arm $A^7$ secured to the shaft $A^4$ is engaged and moved against the action of the spring $A^5$ from the full line position into its dotted line position of the arm $A^7$ shown in Fig. 6, by the arm B' of a lever B, when the latter is turned clockwise as seen in Fig. 6 about its pivotal support $B^2$. With the switch arm $A^7$ in the dotted line position shown in Fig. 6, the brush portion $a$ of the switch A is out of engagement with the contact A' and is in engagement with the contacts $A^2$ and $A^3$. The contacts A', $A^2$ and $A^3$ are carried by the body 20.

At the beginning of each recalibration operation the lever B is moved from its full line into its dotted line position shown in Fig. 5, by a lever 50, which then moves from its position shown in full lines into the dotted line position shown in Fig. 5. The lever 50 which is pivotally connected to the instrument framework by the pivot pin 50', so moves under the action of a spring 51. Except during the recalibration periods the lever 50 is held in the retracted position shown in full lines in Fig. 5 by a latching means comprising a hook 52 and a latch lever 53. The latch member 53 is pivotally connected to the instrument framework by a pivot pin 53', and normally occupies the position shown in dotted lines in Fig. 5. The hook member 52 is pivotally connected to an arm of the lever 50 by a pivot pin 52' which is directly back of the pivot pin 53' when the parts are in the positions shown in Figs. 2 and 2A. Normally the hook shoulder 52'' of the hook member 52 engages a latch shoulder 53'' of the member 53 so that the member 52 is thereby held in the dotted line position shown in Fig. 5. When in such position the hook member 52, through its pivotal connection 52' holds the lever 50 in its retracted position shown in full lines in Fig. 5. The member 53 has a gravital tendency to move from its position shown in full lines into its position shown in dotted lines in Fig. 5. In the latter position the tail portion $53a$ of the lever 53 engages and is supported by the shaft 35.

Once during each counter-clockwise rotation of the roll 27 the tripping projection 27' engages the member 53 and moves the latter clockwise from its dotted line position into its full line position shown in Fig. 5. In the latter position the projection 27' has passed out of direct engagement with the latch member 53, but is in engagement with the end of the hook member 52 which by its frictional engagement with the member 53, prevents the latter from turning back into its dotted line position until the first down stroke of the pawl lever 38 thereafter occurring. On such down stroke, the end 38'' of the lever 38 engages a projection 50'' of the lever 50 and gives the latter a clockwise movement small in extent but sufficient to slightly raise the hook lever 52, thereby releasing its frictional grip on the latch member 53 which then moves under the action of gravity into its dotted line position. When immediately thereafter the lever 38 returns to its normal position, the lever 50 turns counter-clockwise under the action of the spring 51 and thereby shifts the switch A out of engagement with the contact A' and into engagement with the contacts $A^2$ and $A^3$.

The counter-clockwise movement of the lever 50 under the action of the spring 51 lowers the pivot pin 52' and thereby lowers the hook member 52 so that the latter is no longer engaged by the projection 27', whereupon the member 52 turns counter-clockwise under the action of gravity until it engages the member 53. Such engagement, however, does not of itself result in the operative re-engagement of the hook shoulder 52'' with the latch shoulder 53'' as the shoulder 52'' is then too near the pivot pin 53'. The shoulders 52'' and 53'' do operatively re-engage, however, on the next down stroke of the latch lever 38. On the occurrence of that down stroke, the end 38'' of the lever 38 returns the lever 50 into its normal full line position and moves it beyond that position the slight extent necessary to permit the shoulder 52'' to drop down over the shoulder 53''. The engagement of those shoulders prevents counter-clockwise movement of the lever 50 out of its full line position on the return up stroke of the lever 38. The down stroke of the lever 38 which thus resubjects the lever 50 to the control of the latching action of the members 52 and 53 completes the recalibration action and returns the instrument into the condition in which it it can perform its normal measuring functions. As will be understood, when the lever 50 is returned to its full line position the switch A moves under the action of the spring $A^5$ back into the position in which it is out of engagement with the contacts $A^2$ and $A^3$ and is in engagement with the contact A'.

The down stroke of the lever 38, which initiates the recalibration action, adjusts the members 46 and 48 into their respective positions shown in Fig. 3 and the member 46 must be returned into its position shown in Fig. 2 to thereby return the member 45 into its position shown in full lines in Fig. 2, before the rocker arm 8' can effect the down stroke of the lever 38 which completes the recalibration action. Such return movement of the member 46 into the position shown in full lines in Fig. 2, is effected by oscillations of the rocker arm 8 varying in number in accordance with the deflection of the galvanometer pointer 2 exactly as in the previously described potentiometer rebalancing operation. So far as the return of the member 46 is concerned, the only difference is that in the recalibration operation the galvanometer pointer deflects from its neutral or zero position in accordance with unbalance between the potential drop in the resistor $R^5$ and the voltage of the standard cell $SBa$, while in the potentiometer rebalancing operations the pointer deflects in response to the difference between the thermocouple voltage and the potential difference between the bridging contact 19 and the junction of the resistances $R^4$ and R⁵ to which one terminal of the galvanometer is connected.

When the lever 50 moves the lever B from its full line position into its dotted line position shown in Fig. 6, a long gear pinion B³ journalled on the lever B is moved into the position in which the teeth of the pinion B³ are in mesh with the teeth of the previously mentioned gear 21d and with the teeth of a gear 19g. The latter which is above described and similar to the gear 21d, is secured to the shaft 19ᴬ. The pinion B³ then compels the gear 21d to turn with the gear 19g when the latter is turned. The movement of the lever B which puts the pinion B³ in mesh with the gears 19g and 21d frees the latter from the locking action of the arm A⁶. In consequence, on each movement imparted to the shaft 19ᴬ through the wheel 18 during the recalibration period, the tubular shaft 21a turns with the shaft 19ᴬ.

As will be apparent from what has previously been said, the turning movements of the shaft 21a occurring during the recalibration action result directly from the deflection of the galvanometer pointer 2 from its zero position, and result in adjustments of the bridging contact 21 ultimately bringing the galvanometer pointer 2 into its zero position. The galvanometer pointer can be moved into, and maintained in its neutral position during the recalibration action, only as a result of such adjustment of the contact 21 as effects proper calibration by making the amount of the resistor RA in circuit that is required for the proper strength of the current flow from the cell Ba through the slide wire resistance R.

The instrument mechanism, insofar as it has already been described, would operate to make a record impression and to adjust the selector switch 39 by the down stroke of the ratchet lever 38 which completes the recalibration action. A record impression and selector switch adjustment is then unnecessary and undesirable, and in accordance with the present invention I have provided means for preventing the instrument from making such impression and adjustment at such time. The means which I have provided for this purpose comprises a lever consisting of two members 54a (Fig. 2) and 54b (Fig. 5). The two members 54a and 54b are each journalled on the shaft 35 at opposite sides of the toothed wheel 36. One end of the member 54b is rigidly connected to the corresponding end of the member 54a by a yoke pin 54'. The other end of the member 54b is formed with an aperture 54c traversed by the pivot pin 52' connecting the lever 50 and the hook member 52 and elongated to avoid interference with the turning movement of the lever 50. In consequence, a counter-clockwise movement of the lever 50 out of the position shown in Fig. 2 produces a corresponding clockwise movement of the lever formed by the members 54a and 54b. Such clockwise movement of the member 54a carries the end 54 of that member into the position in which it prevents the operating pawl 37 from engaging a tooth of the wheel 36 on the down stroke of the ratchet lever 38. In consequence, the down stroke of the pawl lever 38 which concludes the recalibration operation does not give angular movement of the wheel 36 and shaft 35, and does not result, therefore, in the adjustment of the selector switch 39 or in such actuation of the record carriage hammer 25 as is required for the production of a record impression.

While in accordance with the provisions of the statutes, I have illustrated and described the best form of embodiment of my invention now known to me, it will be apparent to those skilled in the art that changes may be made in the form of the apparatus disclosed without departing from the spirit of the invention as set forth in the appended claims, and that in some cases certain features of my invention may be used to advantage without a corresponding use of other features.

I claim:

1. The combination with potentiometer circuit means including an energization regulator, of a galvanometer, a periodically operating driving mechanism, means associating said galvanometer, driving mechanism and circuit means during recalibration periods for galvanometer deflection in accordance with the potentiometer energization and for adjustment of said regulator in accordance with the galvanometer deflection, and means actuated by said driving mechanism and controlled by the galvanometer deflections for making each such recalibration period include a plurality of operations of said driving mechanism dependent in number upon the character of galvanometer deflections occurring during such period.

2. Potentiometric measuring means adapted for automatic recalibration during recalibration periods between successive measuring periods and comprising in combination potentiometer circuit means including a measuring potential adjuster and an energization regulator, a galvanometer, a periodically operating driving mechanism, means associating said galvanometer, driving mechanism and circuit means during each measurement period for galvanometer deflection in response to unbalance between a potential to be measured and the potentiometer measuring potential and for actuation of said adjuster in accordance with galvanometer deflection, and during each recalibration period for galvanometer deflection in accordance with the potentiometer energization and for adjustment of said regulator in accordance with galvanometer deflection, and means actuated by said driving mechanism and controlled by the galvanometer deflections for making each such recalibration period include a plurality of operations of said driving mechanism dependent in number upon the character of galvanometer deflections occurring during such period.

3. Potentiometric measuring means adapted for automatic recalibration during recalibration periods between successive measuring periods and comprising in combination potentiometer circuit means including a measuring potential adjuster and an energization regulator, a galvanometer, a periodically operating driving mechanism, means associating said galvanometer, driving mechanism and circuit means during each measurement period for galvanometer deflection in response to unbalance between a potential to be measured and the potentiometer measuring potential and for actuation of said adjuster in accordance with galvanometer deflection, and during each recalibration period for galvanometer deflection in accordance with the potentiometer energization and for adjustment of said regulator in accordance with galvanometer deflection, and means actuated by said driving mechanism and controlled by the galvanometer deflections for making each such period include a plurality of operations of said driving mechanism dependent in number upon the character of galvanometer deflections occurring during such period.

4. Potentiometer measuring means adapted for automatic recalibration during recalibration periods between successive measuring periods and comprising in combination potentiometer circuit means including a measuring potential adjuster and an energization regulator, a galvanometer, periodically operating driving means, adjustable means associating said galvanometer, driving means and circuit means during each measurement period for galvanometer deflection in response to unbalance between a potential to be measured and the potentiometer measuring potential and for actuation of said adjuster in accordance with the galvanometer deflections, and during each recalibration period for galvanometer deflection in accordance with the potentiometer energization and for adjustment of said regulator in accordance with the galvanometer deflections, mechanism automatically set into operation by said driving means at the end of each measuring period, and means preventing the operation of said mechanism at the end of each recalibration period.

5. Potentiometric measuring means adapted for automatic recalibration during recalibration periods between successive measuring periods and comprising in combination potentiometer circuit means including a measuring potential adjuster and an energization regulator, a galvanometer, a periodically operating driving mechanism, adjustable means associating said galvanometer, driving mechanism and circuit means during each measurement period for galvanometer deflection in response to unbalance between a potential to be measured and the potentiometer measuring potential and for actuation of said adjuster in accordance with galvanometer deflection, and during each recalibration period for galvanometer deflection in accordance with the potentiometer energization and for adjustment of said regulator in accordance with galvanometer deflection, a switch mechanism actuated by said driving mechanism at the end of each measuring period to disconnect one measurable source of potential from, and connect another such source to said galvanometer and circuit means, and means preventing operation of said switch mechanism by said driving mechanism at the end of each recalibration period.

6. In combination, potentiometer circuit means including a measuring potential adjuster and an energization regulator, a galvanometer, periodically operating driving means effecting adjustments dependent on galvanometer deflection of said adjuster during measurement periods, and adjustments of said regulator during each recalibration period, a biased member, latching means normally holding said biased member in a retracted position, latch releasing means periodically actuated by said driving means to institute a recalibration operation, and means actuated by said driving means to return said member to its retracted position and re-latch said latching means and thereby terminate said period after subsequent operations of said driving member dependent in number upon the galvanometer deflection during the recalibration period.

7. In combination, potentiometer circuit means including a measuring potential adjuster and an energization regulator, a galvanometer periodically operating driving means effecting adjustments dependent on galvanometer deflection of said adjuster during measurement periods and adjustments of said regulator during each calibration period, pawl and ratchet means including a pawl actuated by said driving mechanism at the conclusion of each such period, and means actuated by said driving mechanism to initiate and terminate each calibration period, said last mentioned means including a part rendering said pawl and ratchet means inoperative when said pawl is actuated at the conclusion of a calibration period.

8. In potentiometric measuring apparatus, the combination of a body of insulating material, a pair of shafts mounted in said body, one of said shafts being tubular and surrounding the other shaft, a pair of gears respectively secured to said shafts, a movable switch member mounted on said body, gear means carried by said member and moved into and out of a position in which it connects said gears for simultaneous rotation as said member is moved into and out of one position, a calibrating resistance supported by and extending circumferentially about said body, a contact in engagement therewith and connected to and adjusted along said resistance by the rotation of one of said shafts, a potentiometer slide wire resistance supported by and extending circumferentially about said body, a contact in engagement with said resistor and connected to and adjusted along said resistor by rotation of said second shaft, and switch contacts connected to said resistances and selectively engaged by said switch member in accordance with the position of the latter.

9. In a potentiometric measuring apparatus, the combination of a body of insulating material, a pair of shafts mounted in said body, one of said shafts being tubular and surrounding the other shaft, a pair of gears respectively secured to said shafts, a movable switch member mounted on said body, a locking part carried by said switch member and moved into and out of locking engagement with one of said gears by movement of said member into and out of one position, gear means carried by said member and moved into and out of a position in which it connects said gears for simultaneous rotation as said member is moved away from the back into said one position, a calibrating resistance supported by and extending circumferentially about said body, a contact in engagement therewith and connected to and adjusted along said resistance by the rotation of one of said shafts, a potentiometer slide wire resistance supported by and extending circumferentially about said body, a contact in engagement with said resistor and connected to and adjusted along said resistor by rotation of said second shaft, and switch contacts connected to said resistors and selectively engaged by said switch member in accordance with the position of the latter.

10. In combination, potentiometer circuit means including a measuring potential adjuster and an energization regulator, a galvanometer, periodically operating driving means effecting adjustments depending upon galvanometer deflection of said adjuster during measurement periods, and of said regulator during each recalibration period, a member tending to move from one position into a second position in which it initiates a calibration period, said member being returned to said one position by said driving means at the end of each such period, and means maintaining said member in said one position during measurement periods comprising a hook connected to said member and a cooperating latch part.

11. In combination potentiometer circuit means including a measuring potential adjuster and an energization regulator, a galvanometer, periodically operating driving means effecting adjustments depending upon galvanometer deflection of said adjuster during measurement periods, and of said regulator during each recalibration period, a member tending to move from one position into a second position in which it initiates a calibration period, said member being returned to said one position by said driving means at the end of each such period, means maintaining said member in said one position during measurement periods comprising a hook connected to said member and a cooperating latch part of means actuated at intervals by said driving means to disconnect said hook and latch.

12. In combination, potentiometer circuit means including a measuring potential adjuster and an energization regulator, a galvanometer, periodically operating driving means effecting adjustments depending upon galvanometer deflection of said adjuster during measurement periods, and of said regulator during each recalibration period, a member tending to move from one position into a second position in which it initiates a calibration period, said member being returned to said one position by said driving means at the end of each such period, means maintaining said member in said one position during measurement periods comprising a hook connected to said member and a cooperating latch part tending to occupy one position but movable therefrom into a second position, and a part rotated by said driving means and successively actuating said latch and hook once during each revolution to move said latch part into said second position without disengaging said hook and latch part and to thereafter permit a return movement of the latch part while preventing a corresponding return movement of the hook whereby said hook is disengaged from said latch part.

13. In combination potentiometer circuit means including a measuring potential adjuster and an energization regulator, a galvanometer, periodically operating driving means effecting adjustments depending upon galvanometer deflection of said adjuster during measurement periods, and of said regulator during each recalibration period, a member tending to move from one position into a second position in which it initiates a calibration period, said member being returned to said one position by said driving means at the end of each such period, means maintaining said member in said one position during measurement periods comprising a hook connected to said member and a cooperating latch part tending to occupy one position but movable therefrom into a second position, and a part rotated by said driving means into positions in which it successively engages said latch and hook once during each revolution to move said latch part into said second position without disengaging said hook and latch part and to thereafter permit a return movement of the latch part while preventing a corresponding return movement of the hook whereby said hook is disengaged from said latch part, said hook being thereafter moved out of engagement with said rotating part by movement of said member into said second position.

14. In combination potentiometer circuit means including a measuring potential adjuster and an energization regulator, a galvanometer, periodically operating driving means effecting adjustments depending upon galvanometer deflection of said adjuster during measurement periods, and of said regulator during each recalibration period, a member tending to move from one position into a second position in which it initiates a calibration period, said member being returned to said one position by said driving means at the end of each such period, means maintaining said member in said one position during measurement periods comprising a hook connected to said member and a cooperating latch part tending to occupy one position but movable therefrom into a second position, and a part rotated by said driving means into positions in which it successively engages said latch and hook once during each revolution to move said latch part into said second position without disengaging said hook and latch part and to thereafter permit a return movement of the latch part while preventing a corresponding return movement of the hook whereby said hook is disengaged from said latch part, said hook being thereafter moved by said member out of engagement with said rotating member and back into locking engagement with said locking part as said member moves into said second position and then back into said one position.

THOMAS R. HARRISON.